(12) United States Patent
Codato et al.

(10) Patent No.: US 10,915,722 B2
(45) Date of Patent: Feb. 9, 2021

(54) ADD-ON WITH WIRELESS REMOTE TRIGGER FOR MOBILE COMPUTERS

(71) Applicant: Datalogic IP Tech S.r.l., Lippo di Calderara di Reno (IT)

(72) Inventors: Sandro Codato, Mestre (IT); Paolo Mazzocato, Casier (IT); Franco Favaro, Noale Venezia (IT)

(73) Assignee: DATALOGIC IP TECH S.R.L., Lippo di Calderara (IT)

( * ) Notice: Subject to any disclaimer, the term of this patent is extended or adjusted under 35 U.S.C. 154(b) by 40 days.

(21) Appl. No.: 16/014,948

(22) Filed: Jun. 21, 2018

(65) Prior Publication Data

US 2019/0392184 A1    Dec. 26, 2019

(51) Int. Cl.
*G06K 19/00* (2006.01)
*G06K 7/10* (2006.01)
(Continued)

(52) U.S. Cl.
CPC ....... *G06K 7/10881* (2013.01); *G06K 7/1413* (2013.01); *H02J 7/32* (2013.01); *H02N 2/18* (2013.01); *G06K 2007/10524* (2013.01)

(58) Field of Classification Search
CPC ............. G06K 7/10881; G06K 7/1413; G06K 2007/10524; H02J 7/32; H02N 2/18; G06F 1/1632

(Continued)

(56) References Cited

U.S. PATENT DOCUMENTS

| | | | | |
|---|---|---|---|---|
| 4,845,699 A | * | 7/1989 | Kawasaki | ............ G11B 7/0908 369/44.22 |
| 5,514,861 A | * | 5/1996 | Swartz | .................... G06F 1/163 235/462.44 |

(Continued)

FOREIGN PATENT DOCUMENTS

GB     2472876 A     2/2011

OTHER PUBLICATIONS

Borsati, Andrea, Università degli Studi di Padova, Dipartimento Di Ingegneria Dell'Informazione. Corso di Laurea Magistrale in Ingegneria Elettronica. Tesi di laurea magistrale. Studio e sviluppo di circuiti di Energy Harvesting per interruttori wireless (Study and Implementation of Energy Harvesting Circuits for Wireless Switches), 2015-2016, 111 pages. http://tesi.cab.unipd.it/52717/1/Borsati_Andrea.pdf.

(Continued)

*Primary Examiner* — Matthew Mikels
(74) *Attorney, Agent, or Firm* — Shook, Hardy & Bacon L.L.P.

(57) ABSTRACT

A handle or accessory is attached to mobile computers or similar devices. The handle or accessory includes the use of a wireless trigger employing a low energy technology. This trigger does not need a power source since it is provided with a piezoelectric element connected to a power management circuit. The mechanical energy applied from pressing a button is harvested and transformed in electricity and used to enable the low energy technology to communicate wirelessly with a mobile computer or similar device. Different pairing methods can be implemented in the invention to connect the handle or accessory with the mobile computer or similar device.

20 Claims, 5 Drawing Sheets

(51) Int. Cl.
 *G06K 7/14* (2006.01)
 *H02J 7/32* (2006.01)
 *H02N 2/18* (2006.01)

(58) Field of Classification Search
 USPC .............................. 235/435, 439, 454, 462
 See application file for complete search history.

(56) References Cited

U.S. PATENT DOCUMENTS

| | | | |
|---|---|---|---|
| 6,057,554 A | 5/2000 | Plesko | |
| 9,888,337 B1 | 2/2018 | Zalewski et al. | |
| 2003/0059051 A1* | 3/2003 | Hatano | H04L 63/0428 380/270 |
| 2011/0080414 A1* | 4/2011 | Wang | G06K 7/10722 345/502 |
| 2012/0315845 A1* | 12/2012 | Buczek | H04M 1/7253 455/41.1 |
| 2014/0049120 A1 | 2/2014 | Kohtz et al. | |
| 2017/0076888 A1 | 3/2017 | Ruff | |
| 2018/0068145 A1 | 3/2018 | Todeschini | |

OTHER PUBLICATIONS

Mumenthaler, Sven, "Dynapic® Wireless World's First Piezo Wireless Switch: No Battery, No Cable, No Wear, Slim Design," Algra, Jan. 2016, 26 pages. https://www.algragroup.ch/wp-content/uploads/2016/01/Dynapic_Wireless_presentation.pdf.

Easyfit by EnOcean, Wall Switch Single / Double Rocker for BLE, EnOcean, Jan. 2018, 1 page. https://www.enocean.com/en/enocean_modules_2.4ghz_ble/single-double-rocker-wall-switch-for-ble-eswsb-edwsb/data-sheet-pdf/.

Piezoceramic Actuators, piceramic.com, PI Ceramic GmbH, 2018, 3 pages. https://www.piceramic.com/en/products/piezoceramic-actuators/.

Shrestha, Bikash, "Measurement of power consumption of BLE (Bluetooth Low Energy)". Helsinki Metropolia University of Applied Sciences. Oct. 6, 2016, 41 pages. https://publications.theseus.fi/bitstream/handle/10024/118662/Shrestha_Bikash.pdf?sequence=1.

Nork, Sam, "Practical Design Considerations for Piezoelectric Energy Harvesting Applications", Linear Technology Corporation, Mar., 2011, 27 pages.

Extended search report dated Nov. 25, 2019 in European Patent Application No. 19181325.2, 10 pages.

* cited by examiner

ADD-ON WITH WIRELESS REMOTE TRIGGER FOR MOBILE COMPUTERS

CROSS-REFERENCE TO RELATED APPLICATIONS

None.

BACKGROUND

Mobile computers (including mobile devices) are worldwide and used for data collection and management, stock monitoring, and so on. A big effort is done abundantly by designers to have in the marketplace units able to provide, at the same time, both ergonomics, easy access to the information and a pleasant design, aligned to the latest trends. Currently, the trend for industrial mobile computers is to go towards terminals that look like smartphones, with a very large display, capacitive touchpad, and very few physical keys.

In general, mobile computers specifically designed for data collection purposes have an embedded code-reader. The "trigger" key, used to activate the scan-engine, should be placed in a very comfortable position. Sometimes, the adoption of very large displays and the absence of a physical keyboard on the top side lead to "trigger" keys being placed in an uncomfortable location, not suitable to be pressed using the same hand that is used to manage the computer. The solution so far provided to add a physical trigger to a handheld device consists of a handle with levers that can press a button available on the device that in many cases was designed for other purposes. This solution suffers from three major problems: 1) It cannot be used on devices that do not have any physical button; 2) If a physical button is present on the device, but was not designed for intensive use, the application of this solution will lead to quick degradation, resulting in the need to repair the device itself; and 3) The physical button on the device, used for the trigger function, will no longer be available for its original function.

In order to partially overcome the problem above, sometimes the key is a "virtual" one, "drawn" as an icon on the screen. This solution is quite good, but a part of the screen has to be "wasted" for this purpose. In addition, such soft keys on the screen do not provide any mechanical feedback to the user.

Sometimes, there is no space for a rugged button, or the need to have a handle comes too late when the project is already finished and the computer is already in mass production. In this case, alternatives might be: 1) Give up the handle, with a big, negative, impact on the business; or 2) Try to design a handle that uses a button already present on the terminal surface, originally designed for other purposes, like volume up/down etc. This solution is not always viable, due to mechanical robustness of the button, not able to withstand up to one million or more shots; or the location of the button is very hard to reach using levers or similar means.

A solution is needed that takes advantage of add-on handles where terminals should be designed, from the beginning, with a devoted rugged trigger button, which is often placed on the bottom side, able to withstand up to one million or more shots. The trigger key, provided by the handle, presses the trigger button on the terminal surface.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

This invention discloses an accessory able to: 1) Communicate with the terminal by wireless means, exploiting a wireless interface widely available in the modern handheld devices; 2) Send the "activate" command or any other functional command to the device, without using buttons on the terminal surface; and 3) Operate without any battery or, if present, provide an extreme long autonomy.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
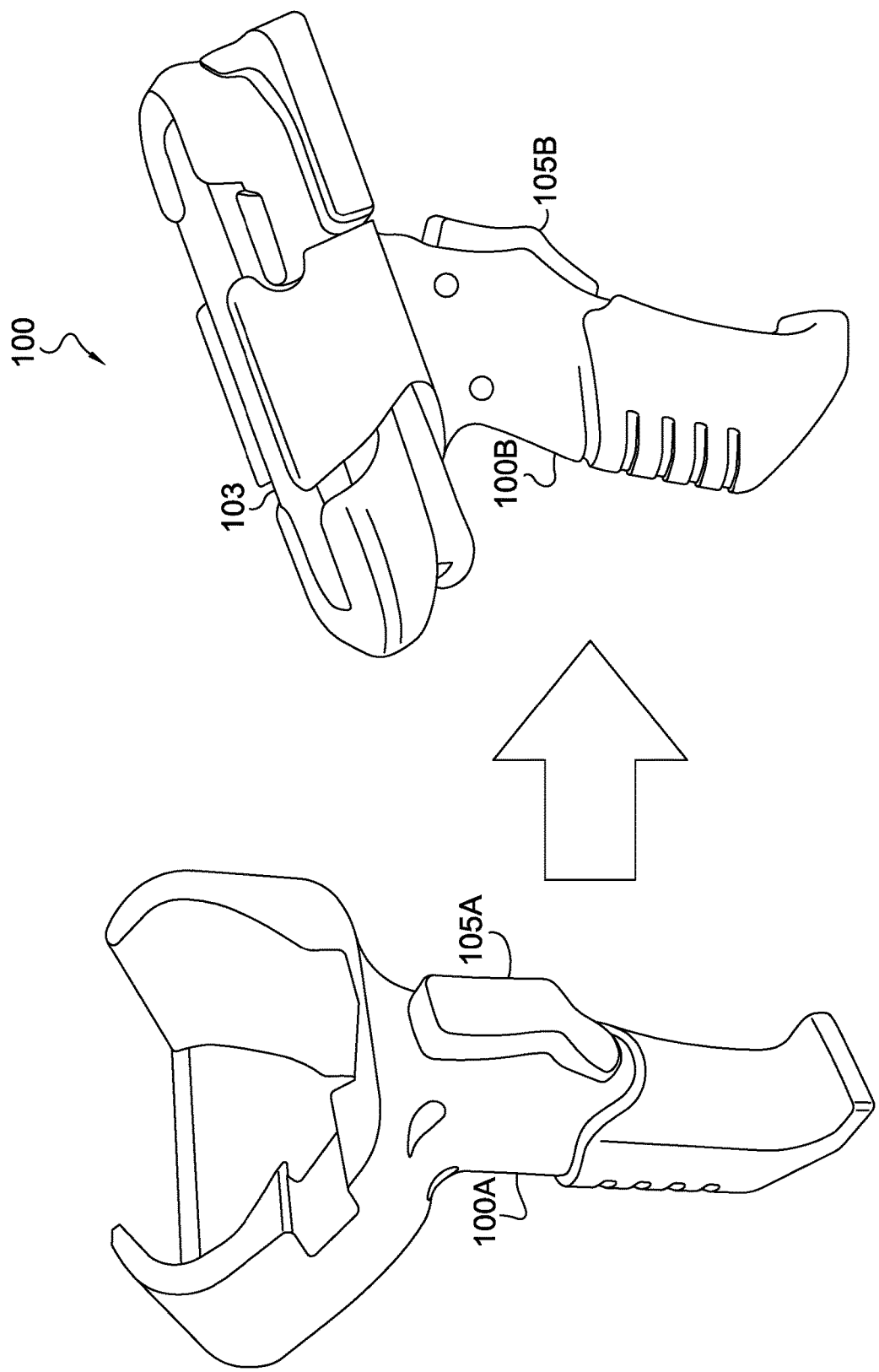
FIG. 1 is a block diagram of an exemplary wireless remote trigger system, implemented in accordance with an embodiment of the present invention.

The subject matter of aspects of the present invention is described with specificity herein to meet statutory requirements. However, the description itself is not intended to limit the scope of this patent.

The present invention overcomes the problems of the handles with levers, by substituting the mechanical transmission of the activation of an external trigger inside a handheld device, with a wireless transmission, by exploiting a widely used wireless interface already available in the handheld device.

The wireless add-on handle can be used on all handheld devices even if the devices have not been equipped with a dedicated rugged button, without having problems with premature wear of buttons that are not suitable for the purpose and leaving the buttons on the devices available for their original function. Furthermore, the wireless transmission can be done without the need of a battery, by exploiting the mechanical energy used to press the physical trigger and converted into electrical energy, thus avoiding any need for additional maintenance. The present invention provides a remote button accessory for mobile computers, which is preferably used to control a scan engine for data reading and collection. The remote key, described in the invention, communicates with the terminal by wireless means, not using any physical key on the mobile computer's surface, allowing an easy upgrade/installation also for computers that have not been designed, from the beginning, with a devoted trigger button.

In a first aspect, an apparatus for providing efficient communications to a mobile computer is provided that includes a handle device for holding a mobile computer. The handle device includes a piezoelectric button. The piezoelectric button is a trigger that moves in a direction when a hand grips the handle device and a finger of the hand moves into a gripping position when the finger is against the trigger, and the trigger moves back to a resting position in an opposite direction while the hand grips the handle device and the finger moves into an extended position when the finger is against the trigger. The piezoelectric button is connected a power management circuit in the handle device. The power management circuit holds and controls piezoelectricity that is generated when the piezoelectric button is pressed. A wireless communication system is located in the handheld device and connected to the power management circuit. The wireless communication system uses the piezoelectricity to operate and communicate with the mobile computer.

In a second aspect, a handle for holding a mobile device is provided that includes a mechanical trigger mounted on a handle. A transducer component converts a mechanical energy applied to the mechanical trigger, when pressed, into electrical voltage using a piezoelectric element. An electronic circuit, in the handle, converts the electrical voltage generated by the piezoelectric element to a suitable value to power a wireless module. The wireless module is based on a low energy technology and programmed to transmit a wireless message every time the wireless module is powered. The wireless module transmits the wireless message to the mobile device.

Often, when a huge number of codes have to be collected, a "handle" with trigger is applied, as an "add-on" accessory, to the "smartphone-like" terminals. The handle increases ergonomics and the ease-of-use. See FIG. 1 for example. In other application fields, a battery-less wireless switch is used, exploiting the mechanical energy used to press the key. Mechanical energy is internally converted into electrical energy and used to provide power to the embedded electronics and the radio module.

In FIG. 1, an exemplary wireless trigger button 100 is shown in two configurations. Wireless trigger button 100A is shown in an open position while wireless trigger button 100B is shown in a closed position holding a handheld device 103 (e.g. mobile computer). In some embodiments, wireless trigger buttons 100A and 100B may be referred to as a handle or handle device. Both wireless trigger buttons 100A and 100B have respectively trigger keys 105A and 105B that can be pressed for an action, such as operating a scan engine. Although wireless trigger buttons 100A and 100B take the shape as shown in FIG. 1, other shapes and configurations can be implemented in the invention to accomplish the task of providing a remote wireless trigger function.

When the mechanical trigger on the handle is pressed, the Bluetooth Low Energy (BTLE) module is powered and transmits the wireless message. The handheld device, on which the handle is mounted, is appropriately programmed for receiving and interpreting the wireless message as a command to turn on the embedded scan engine.

In an embodiment, which is a preferred one, the transducer component is able to convert the mechanical energy into electrical energy, based on a piezoelectric element. As an alternative, the transducer component is able to convert the mechanical energy into electrical energy, based on a variation of a magnetic flux in a coil. Magnetic flux is obtained by a permanent magnet and the flux variation is created moving the magnet, when a user presses the button. The performance of piezoelectric elements, as mechanical to electrical energy transducers, is very attractive. Compared to embodiments where magnetic components are used, piezoelectric elements reduce design complexity and effort.

Figure 2:
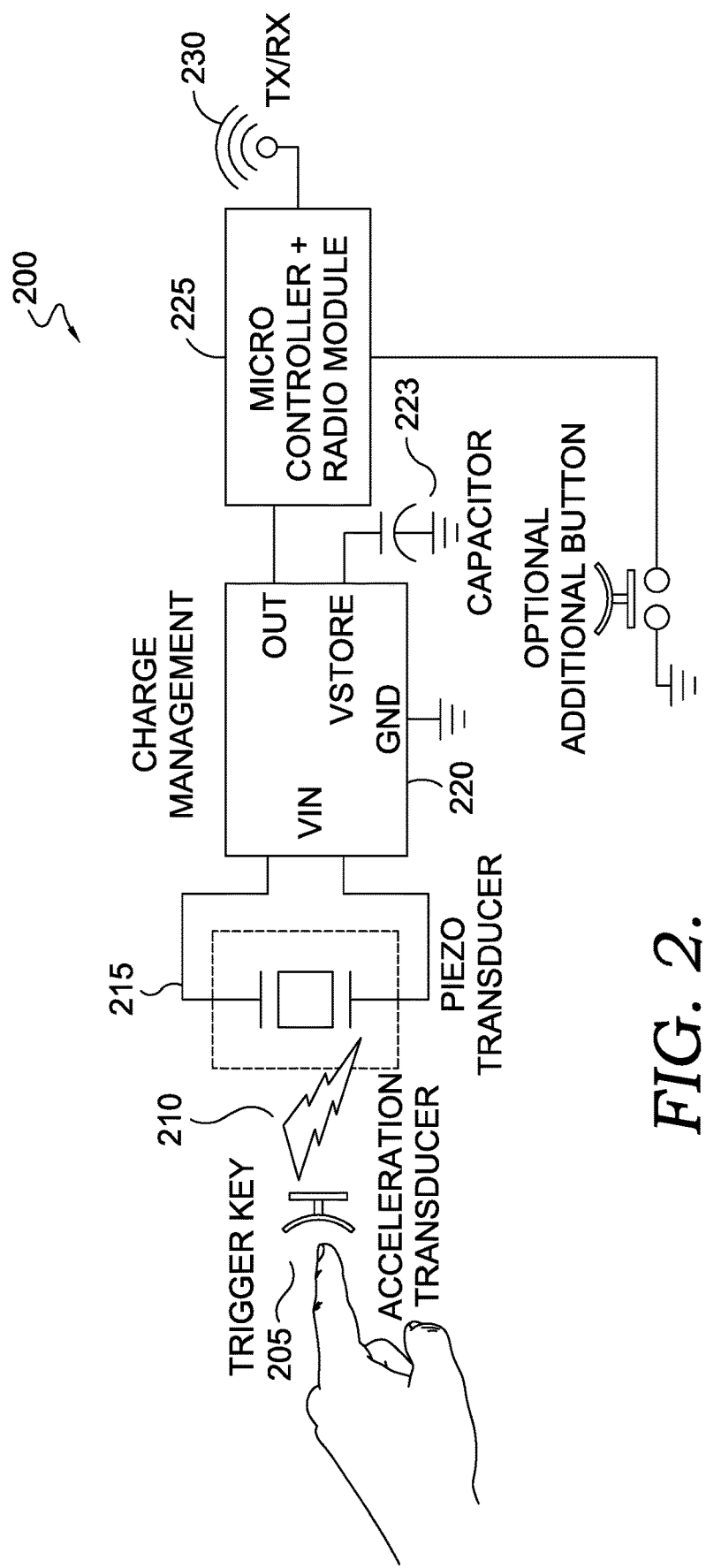
FIG. 2 is an exemplary system, implemented in accordance with an embodiment of the present invention.

The block diagram in FIG. 2 shows an exemplary system 200 in the embodiment, such as Trigger Key 205, Acceleration transducer 210, Piezoelectric transducer 215, Power Management circuit 220, and Microprocessor 225+wireless radio 230. Microprocessor 225 may also be referred to as a microcontroller. Trigger key 105A or 205 is the button in FIG. 1 or FIG. 2 that is pressed by the users to activate the terminal scan engine. The pressing action generates a flexion on the Piezoelectric transducer 215 (also called a piezo element), which translates the mechanical energy into electrical energy.

In the article titled Practical Design Considerations for Piezoelectric Energy Harvesting Applications by Sam Nork, the power consumption of an IEEE 802.15.4 standard system is implemented. The energy requested for each transmission is estimated in roughly 104 micro joules (uJ). The energy requested by other electronic circuits is taken in consideration.

The energy needed to press a button in an ordinary scenario where the application force is five (5) Newtons (N) and the trigger displacement is 10 millimeter (mm) is implemented by the following formula E=Force*Displacement=5*10*1E−3=50 m Joule, which is large, but the efficiency of mechanical to electrical energy conversion is fundamental for project success. Most piezoelectric transducers available in the market have a very low capacity (few nano Farad (nF)) and work at a high voltage (e.g. hundreds of volts). These transducers are not suitable for this invention because this implementation needs a piezoelectric component that is able to store high energy and work at a low voltage.

Figure 3:
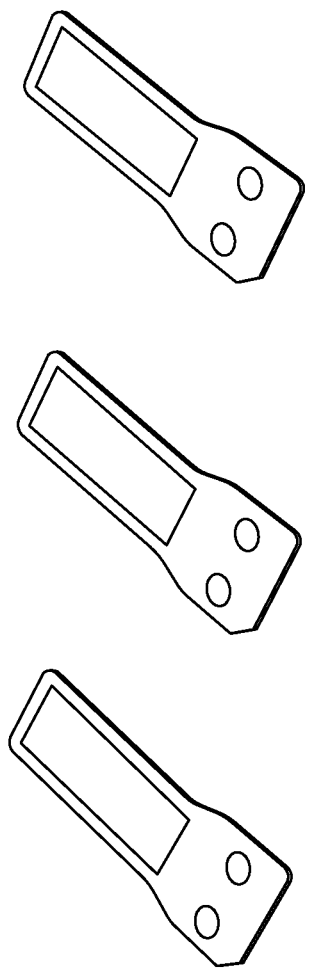
FIG. 3 is an illustration of exemplary transducers, implemented in accordance with an embodiment of the present invention.

Piezoelectric transducers 300 shown in FIG. 3 have a high capacitance (150 nF) and are able to provide power in the milliwatt range. Transducers 300 are able to work at low voltage and can be managed by common electronics. When customers press or release the key 205, the transducer 215 is stimulated by a force that depends on each user, which means the application time cannot be predicted. To solve this problem of an uneven force, a mechanical part called an acceleration transducer 210 is designed to produce on the piezoelectric transducer 215 strong accelerations. The acceleration transducer 210 delivers stored energy in a predictable way and time and is not user dependent. The acceleration transducer 210 is able to hit the piezoelectric transducer 215 in a predictable way when users release the trigger key 205. Typically, the energy is stored in a spring when users press the trigger key 205, which is then released to the piezoelectric transducer 215.

Power Management circuit 220 has the duty to convert the voltage produced by the piezoelectric transducer 215 to a stable direct current (DC) voltage. To get to DC voltage, an extremely low-power step-down converter is implemented, preceded by a full diode bridge, because the voltage provided by the piezoelectric transducer 215 is a variable current, including an alternating current (AC) and a current that is not perfectly symmetric or sinusoidal in waveform. A big capacitor 223 is needed at the output to ensure to have an energy tank (storage) for data transmission when the input pulse at trigger key 205 is concluded.

Radio module 230 includes the wireless communication technology. Radio module 230 is considered a "System on Chip" (SoC). To successfully carry out the design of the invention, it is important to have an electronic circuit able to exhibit negligible power consumption. The goal is to adopt a modern radio concept designed for Internet of Things (IoT) applications, wearable electronics and so on, like Bluetooth low-energy (BLE), Near Field Communication (NFC), ANT, ANT+, ZigBee, Radio Frequency for Consumer Electronics (RF4CE), and others.

In an embodiment, BLE devices (radio module 230) are usually "System on Chip" devices. These BLE devices are very sophisticated devices that integrate almost everything needed to build a complete smart device, as illustrated in FIG. 2. For example, a BLE device implemented as radio module 230 can include a processor, a BLE radio with a complete radio and stack needed to connect to other BLE devices, a memory such as flash and static random-access memory (SRAM), and an input/output (I/O) port.

In some embodiments, radio module 230 can be integrated with microprocessor 225. Together, both components can be found together as a "System on Chip." In other embodiments, microprocessor 225 can function on a chip separately from radio module 225.

The pressing of a scan button, such as trigger key 205, creates an immediate start up of the system 200. Even if radio module 230 might draw a considerable amount of power when running, in the case here, the radiated power can be reduced to a very low value because the counterpart radio in the mobile computer is a small distance (e.g. few centimeters) away. Other low energy wireless technology standards can be used instead of BLE, like NFC, Zigbee, Radio Frequency for Consumer Electronics (RF4CE), ANT, ANT+, and so on. In a different embodiment, an optical communication technology, like Infrared Data Association (IRDA), can be used in place of a radio frequency (RF) technology.

In another embodiment, the wireless remote trigger 100 is not a handle, but it is an accessory having the shape of a thin box that can be attached to the device by means of magnetic latches or Velcro strips or any other suitable mean. In another embodiment, the wireless remote trigger 100 is a wearable accessory that can be attached to the user's clothes or gloves.

In another embodiment, the wireless remote trigger 100 comprises more than one button where each button has the capability to activate a different function on the mobile computer or mobile device. For example, various buttons can be provided to open a menu or scroll or to simulate the physical buttons of mobile phone devices. The benefit here is that there can be multiple buttons connected to a single mobile device. Each button can have its own transducer.

In yet another embodiment, a light or audio signal can be added to the wireless remote trigger 100 to provide feedback to the user when the trigger 205 is engaged (activated).

In an implementation of an embodiment of the invention, the wireless remote trigger 100 can be associated with a handheld device 103 using the trigger key 205 itself to communicate some association data to the handheld device 103. The association data can include, for example, an address that can be used to uniquely identify the wireless remote trigger device 100 mounted with the handheld device 103, or a security key that can be used to validate the wireless messages received. The unique address and the security key can be set on the wireless remote trigger 100 during the manufacturing process or they can be set on site using a personal computer (PC) connected to the wireless remote trigger 100 through a USB interface or other means.

The association data can be communicated by the wireless remote trigger 100 to the handheld device 103 by transmitting an association wireless message that includes the association data when the wireless trigger key 205 is activated. During the association phase, the association message can be transmitted in "broadcast" mode, but only a single computer, where the handle is mounted, thanks to devoted application software, will accept to work with "its own handle." In case the handle is mounted in another mobile computer, a disassociation procedure can be carried out prior to a re-association.

The wireless remote trigger can be programmed to transmit the association message, in place of the trigger message by keeping, a pushbutton pressed while activating the trigger.

Figure 4:
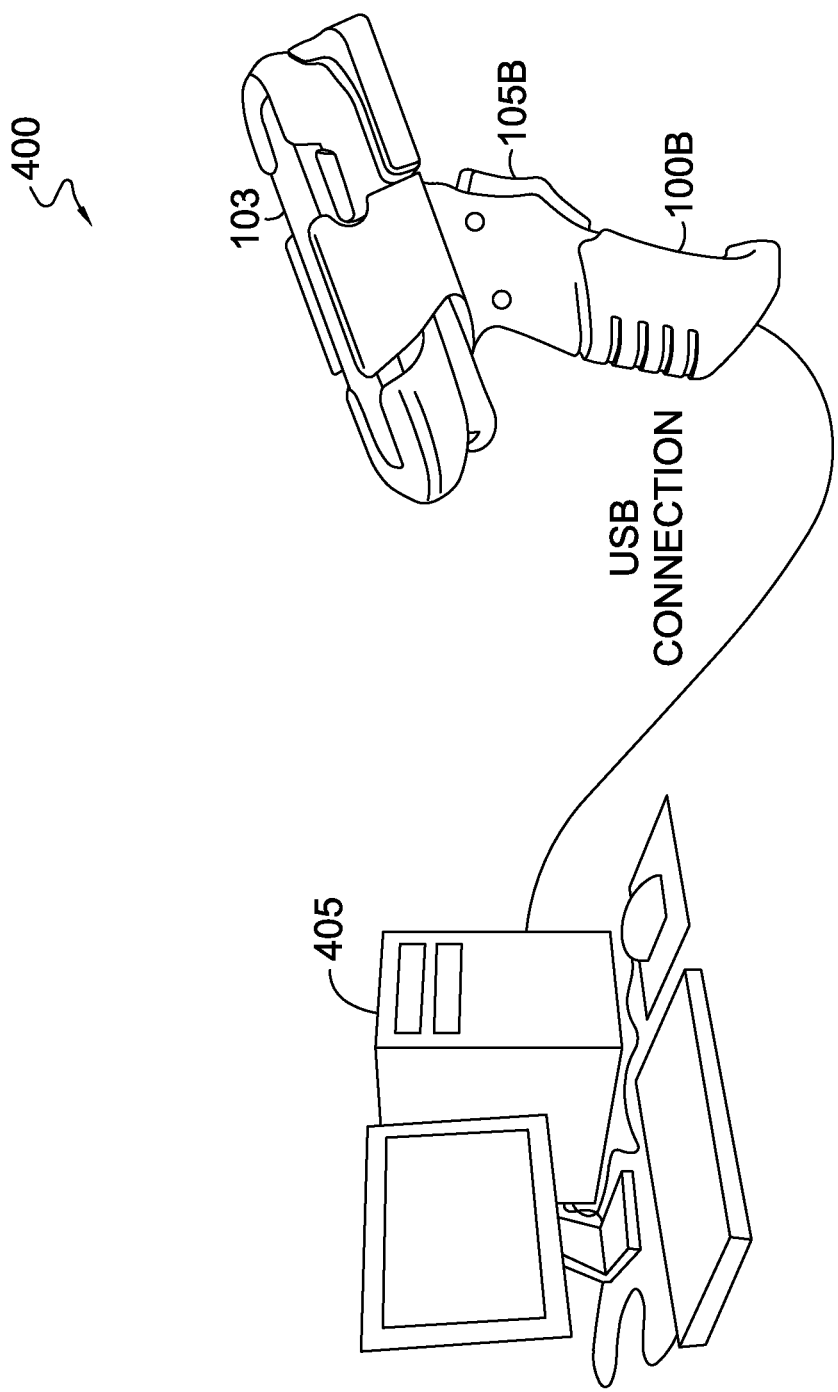
FIG. 4 is an illustration of an exemplary association event using a USB connection, implemented in accordance with an embodiment of the present invention.

In another embodiment, the "association data" can be sent making use of a PC 405, wired and connected to the handle 100B with a USB connection as shown in FIG. 4. Using a wired connection, all operations related to the association can be made without any issue due to energy. In an additional embodiment, the mobile computer 103 receives association data via PC 405 by reading a barcode and so on.

Once the handheld device 103 has acquired the association data, it will be able to safely recognize the wireless messages coming from the wireless remote trigger mounted on it.

In another embodiment, the association of the wireless remote trigger 100 with the handheld device 103 can be done by executing a standard Bluetooth pairing procedure. In this case, the wireless remote trigger 100 can communicate bi-directionally with the handheld device 103. A USB interface available on the wireless remote trigger 100 will power it while executing the pairing procedure. Also, a similar procedure can be implemented in other embodiments using other wireless communications protocols.

If the energy requested by the radio module 230 exceeds the piezoelectric element 215's capabilities, a small battery can be implemented.

Figure 5:
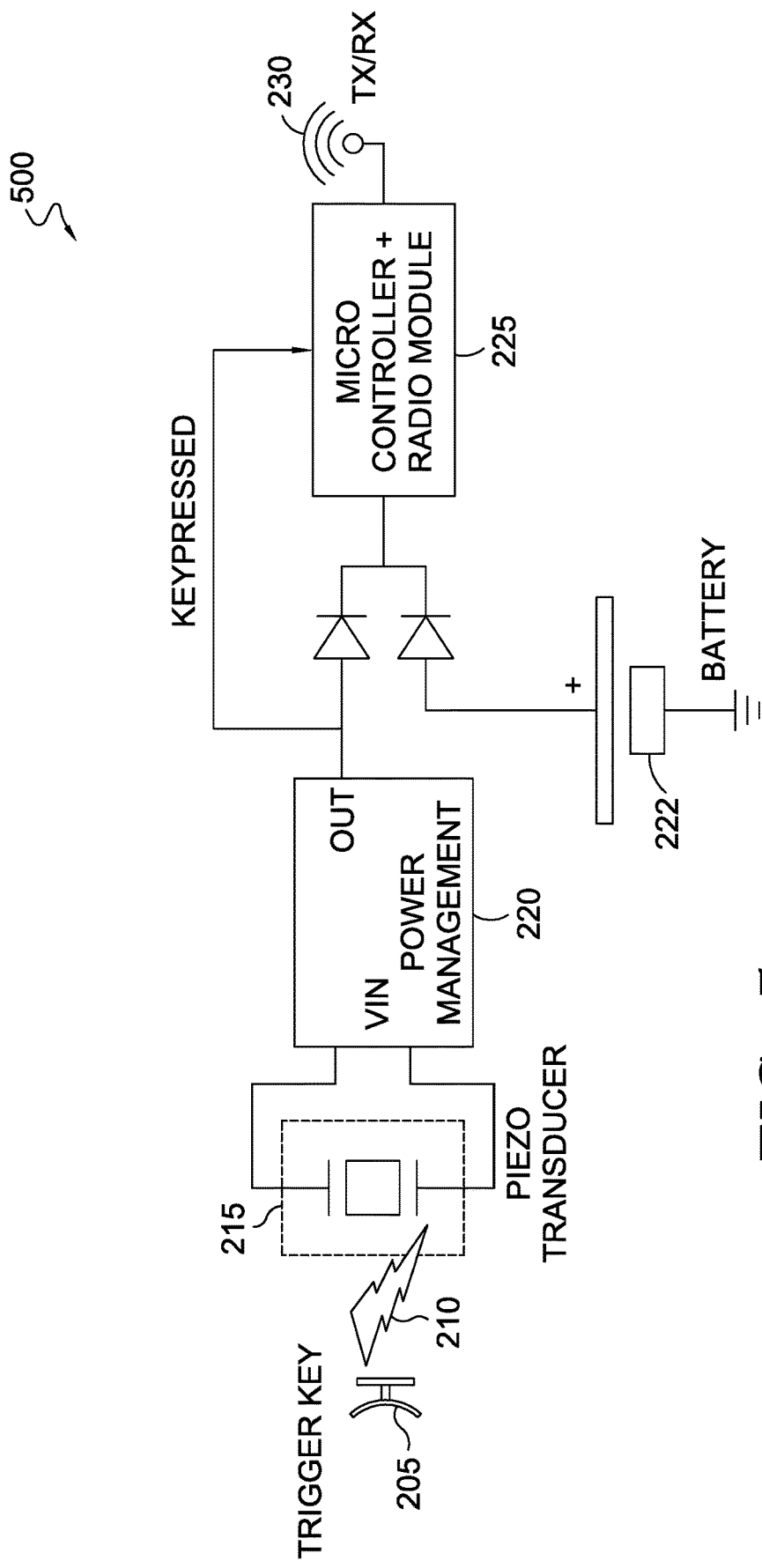
FIG. 5 is another exemplary system, implemented in accordance with an embodiment of the present invention.

In FIG. 5, another exemplary system 500 is shown implementing an embodiment of the invention. Radio module 230 has a small battery 222 that avoids power loss when the trigger 205 is not pressed. This setup prevents the wireless remote trigger button 100 from starting each time from a cold condition. In this case, the piezoelectric element 215 works in parallel with the battery 222, providing a high current when the key 205 is pressed, extending the battery life.

What is claimed is:

1. A device for holding and communicating with a mobile device, comprising:
    a housing configured as an accessory to detachably hold a mobile device;
    a mechanical trigger disposed on the housing;
    a wireless communication module disposed within the housing and configured to transmit a wireless message based on a low energy technology to the mobile device held by the housing for the mobile device to perform an operation responsive to the mechanical trigger being pressed by a user;
    a transducer component disposed within the housing and coupled with the mechanical trigger, the transducer configured to convert the mechanical energy applied to the mechanical trigger, when pressed, into electrical energy; and
    an electronic circuit disposed within the housing and coupled with the transducer component and the wireless communication module, the electronic circuit configured to store the electrical energy generated by the transducer component and adjust the electrical energy to a suitable value of voltage to provide power to the wireless communication module for transmitting the wireless message to the mobile device responsive to the mechanical trigger being pressed by the user.

2. The device of claim 1, wherein the mobile device is configured to scan optical codes responsive to receiving the wireless message from the wireless communication module disposed within the housing.

3. The device of claim 1, wherein the housing has a shape of a thin box that is attached to the mobile device with at least one of a magnet or Velcro.

4. The device of claim 1, wherein the housing is a wearable accessory that is configured to be attached to a user's clothes or glove.

5. The device of claim 1, wherein the transducer component and the electronic circuit convert variable current voltage to direct current (DC) voltage.

6. The device of claim 5, wherein the transducer component is a piezoelectric transducer that converts mechanical energy into electrical energy.

7. The device of claim 5, wherein the transducer component is a magnetic transducer converts mechanical energy into electrical energy based on a magnetic flux in a coil, wherein the magnetic flux is obtained when a magnet moves as the mechanical trigger moves.

8. The device of claim 5, wherein the low energy technology is at least one of Bluetooth Low Energy (BLE), Near-Field Communication (NFC), Zigbee, Radio Frequency for Consumer Electronics (RF4CE), ANT, or ANT+.

9. The device of claim 1, further comprising a battery disposed within the housing and operably coupled with the wireless communication module to prevent power loss when the mechanical trigger is pressed by the user.

10. The device of claim 1, wherein the housing includes a grip for holding the device.

11. The device of claim 10, wherein the mechanical trigger is configured to move in a direction when a hand grips the device and a finger of the hand moves into a gripping position when the finger is against the trigger, and the trigger moves back to a resting position in an opposite direction while the hand grips the device and the finger moves into an extended position when the finger is against the trigger.

12. The device of claim 1, wherein the wireless message includes association data used by the mobile device to associate the mobile device with the wireless module of the device.

13. The device of claim 12, wherein the association data includes an address that uniquely identifies the device.

14. The device of claim 1, wherein the association data includes a security key used by the mobile device to validate wireless messages received from the wireless communication module of the device.

15. The device of claim 14, wherein the wireless communication module is configured to receive the security key from another device on site by the user.

16. The device of claim 1, further comprising a plurality of mechanical trigger buttons disposed on the housing and in communication with the wireless communication module.

17. The device of claim 16, wherein the wireless communication module is configured to transmit different wireless messages to the mobile device associated with different functions to be performed by the mobile device depending on which of the plurality of mechanical trigger buttons was pressed by the user.

18. The device of claim 17, further comprising a plurality of transducers each associated with a different trigger button of the plurality and configured to generate power to provide to the wireless communication module responsive to being pressed by the user.

19. A method of communicating between a handle device and an attached mobile device, the method comprising:
mounting a mobile device on a handle device that is separate and detachable from the mobile device, the handle device having a mechanical trigger, a transducer component, an electronic circuit, and a wireless communication module coupled with each other and disposed within a handle housing;
converting, with a transducer component of the handle device, mechanical energy applied to the mechanical trigger, when pressed, into electrical energy that is stored in the electronic circuit;
adjusting, with the electronic circuit, the electrical energy generated by the transducer component to a suitable value of voltage to provide power to the wireless communication module responsive to the mechanical triggering being pressed by the user;
transmitting, with the wireless communication module powered by the electrical energy generated by the transducer component, a wireless message to the mobile device responsive to the mechanical trigger being pressed by a user; and
performing an operation by the mobile device responsive to receiving the wireless message from the wireless communication module of the handle device.

20. The device of claim 17, wherein the different functions include at least one of opening a menu or simulating physical buttons located on the mobile device to be performed by the mobile device depending on which of the plurality of mechanical trigger buttons was pressed by the user.

* * * * *